Figure 3:
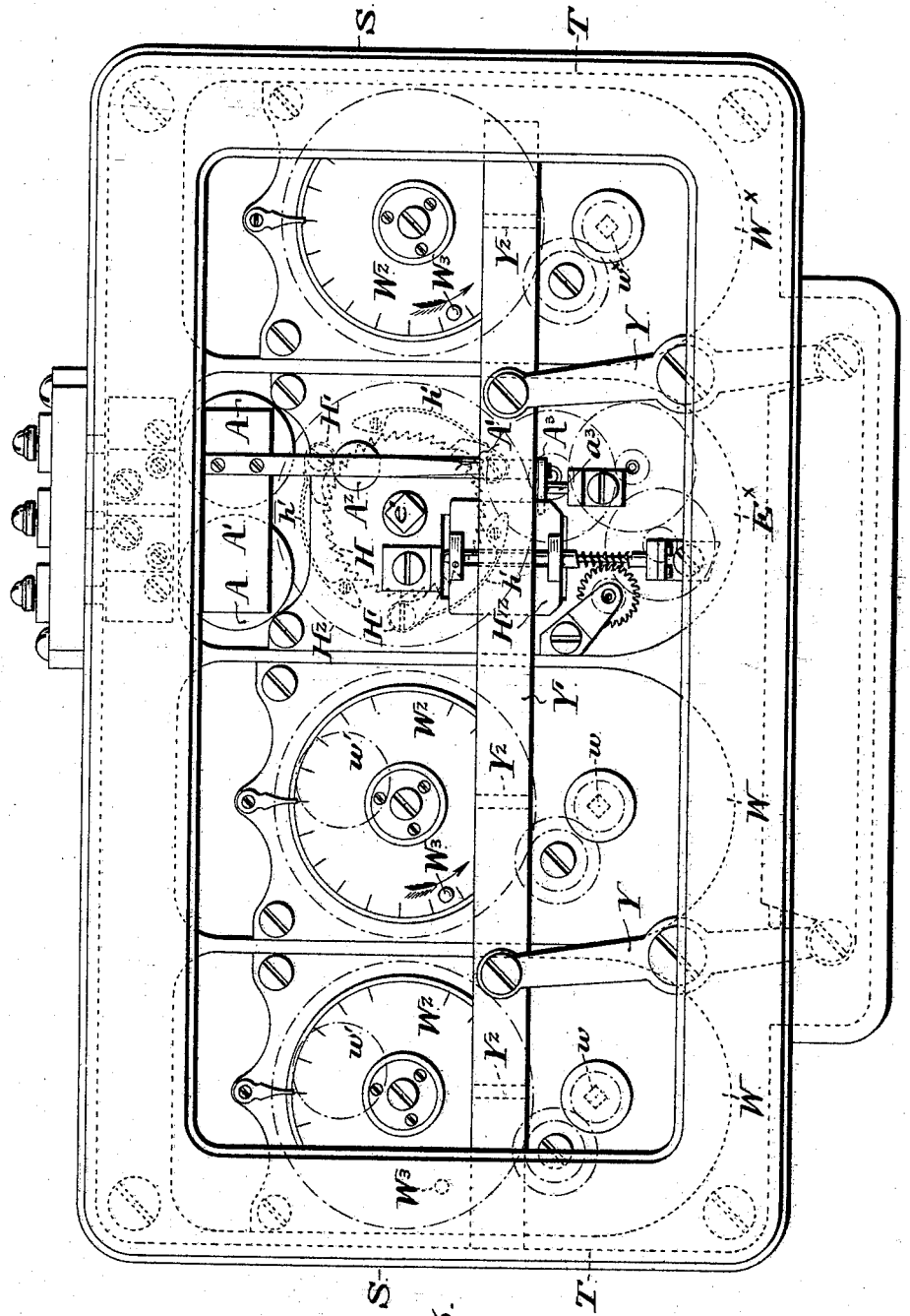

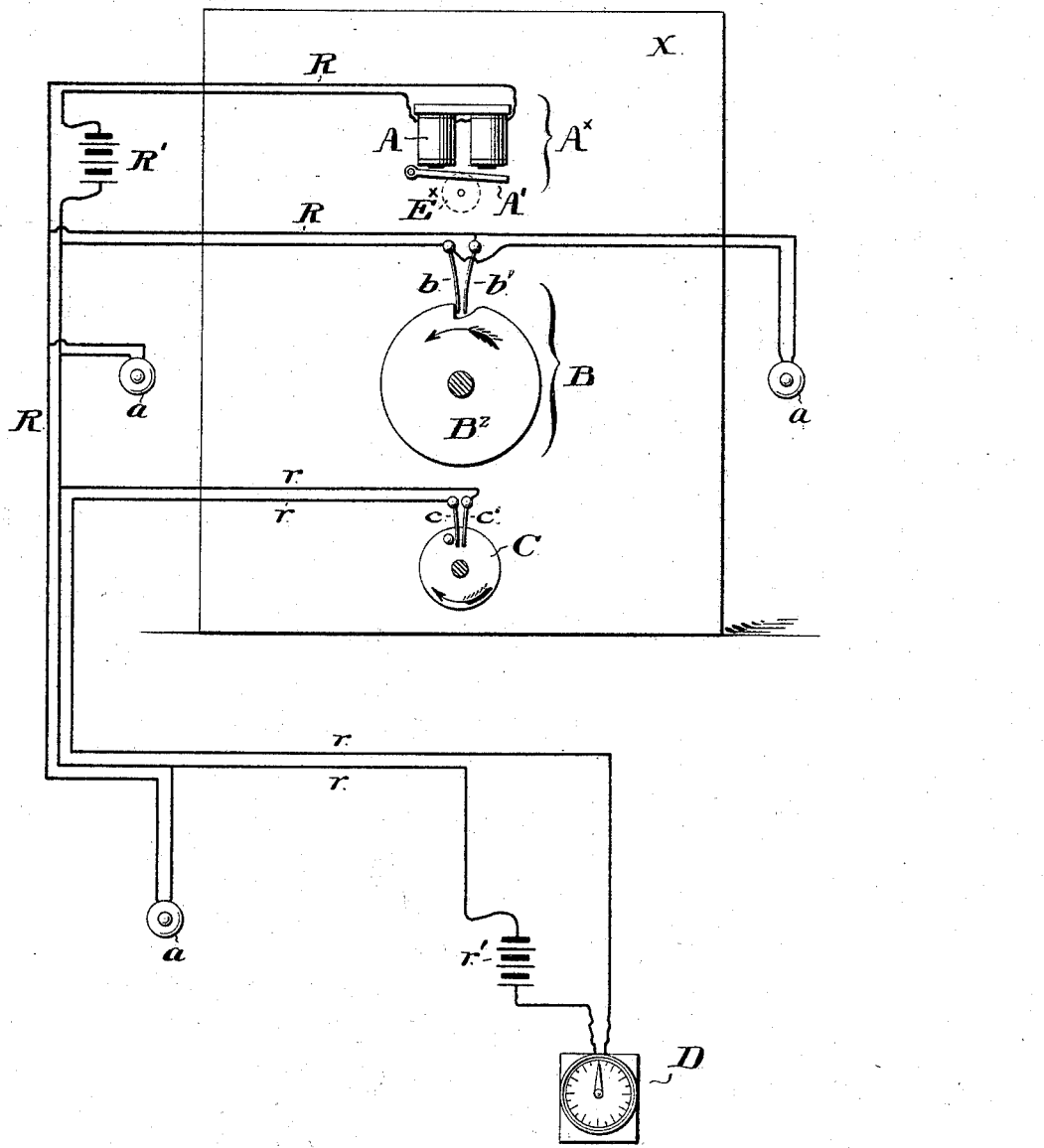

(No Model.) 5 Sheets—Sheet 2.
W. H. HOLLAR, G. L. WEAVER & A. KENNEDY.
ELECTRICALLY CONTROLLED WINDING MECHANISM FOR TIME LOCKS.
No. 545,020. Patented Aug. 20, 1895.
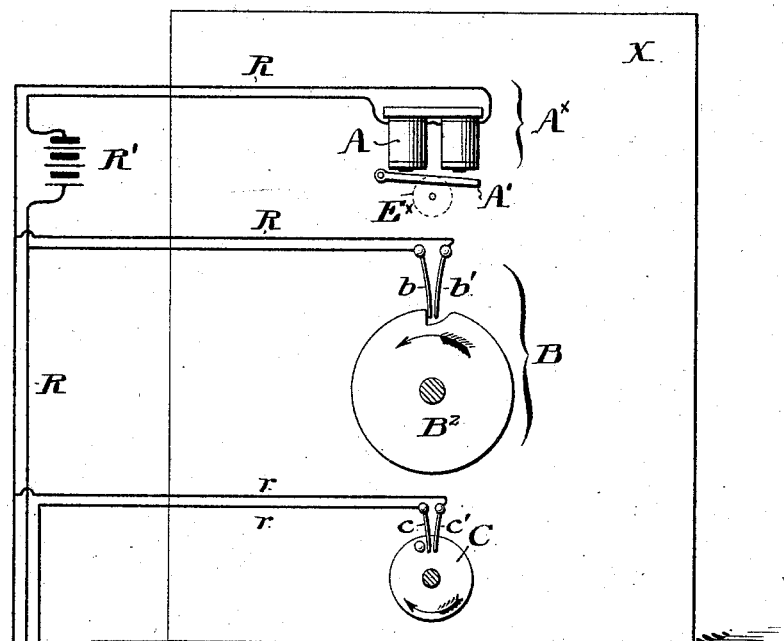
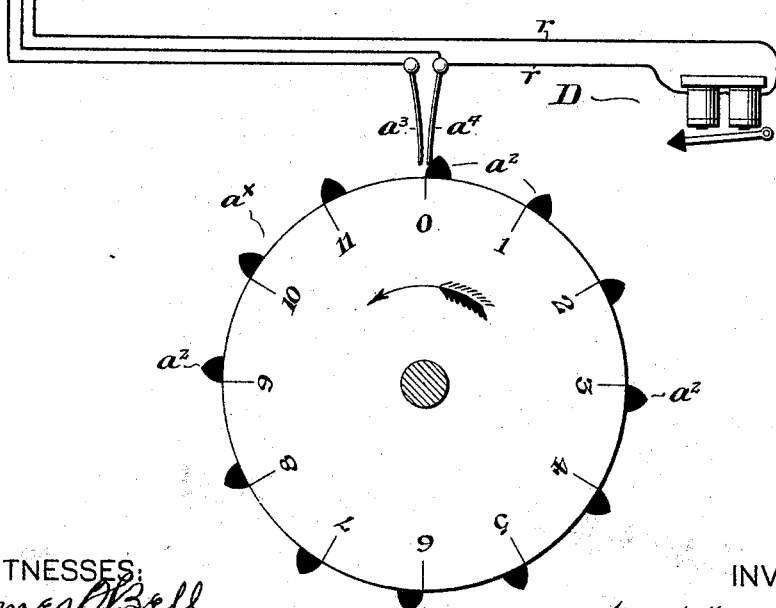
WITNESSES:
James H. Bell
A. E. Paige
INVENTORS:
W. H. Hollar, G. L. Weaver
and A. Kennedy
By Jd. C. Paige, attorney (No Model.) 5 Sheets—Sheet 3.
W. H. HOLLAR, G. L. WEAVER & A. KENNEDY.
ELECTRICALLY CONTROLLED WINDING MECHANISM FOR TIME LOCKS.
No. 545,020. Patented Aug. 20, 1895.

WITNESSES:
INVENTORS:

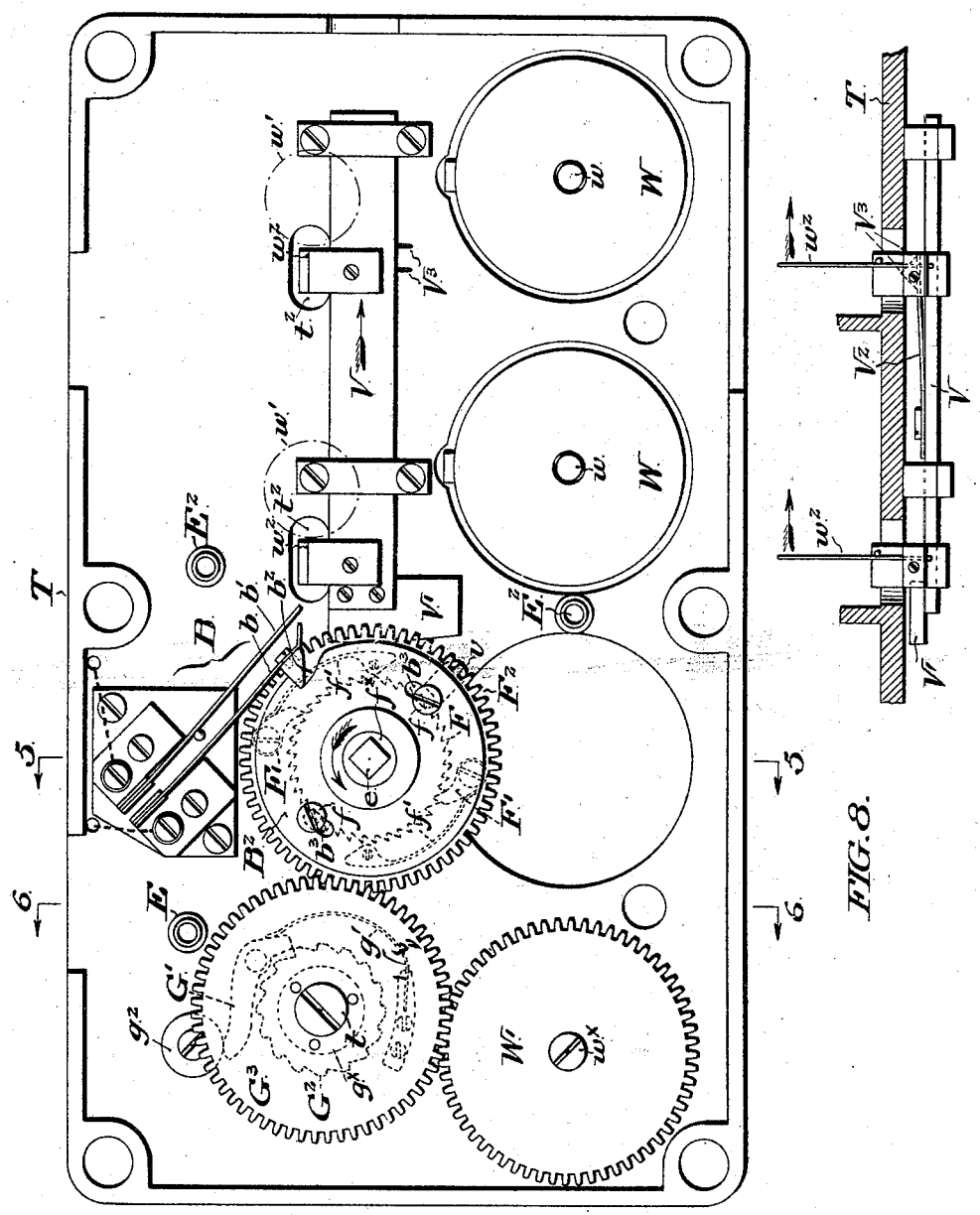

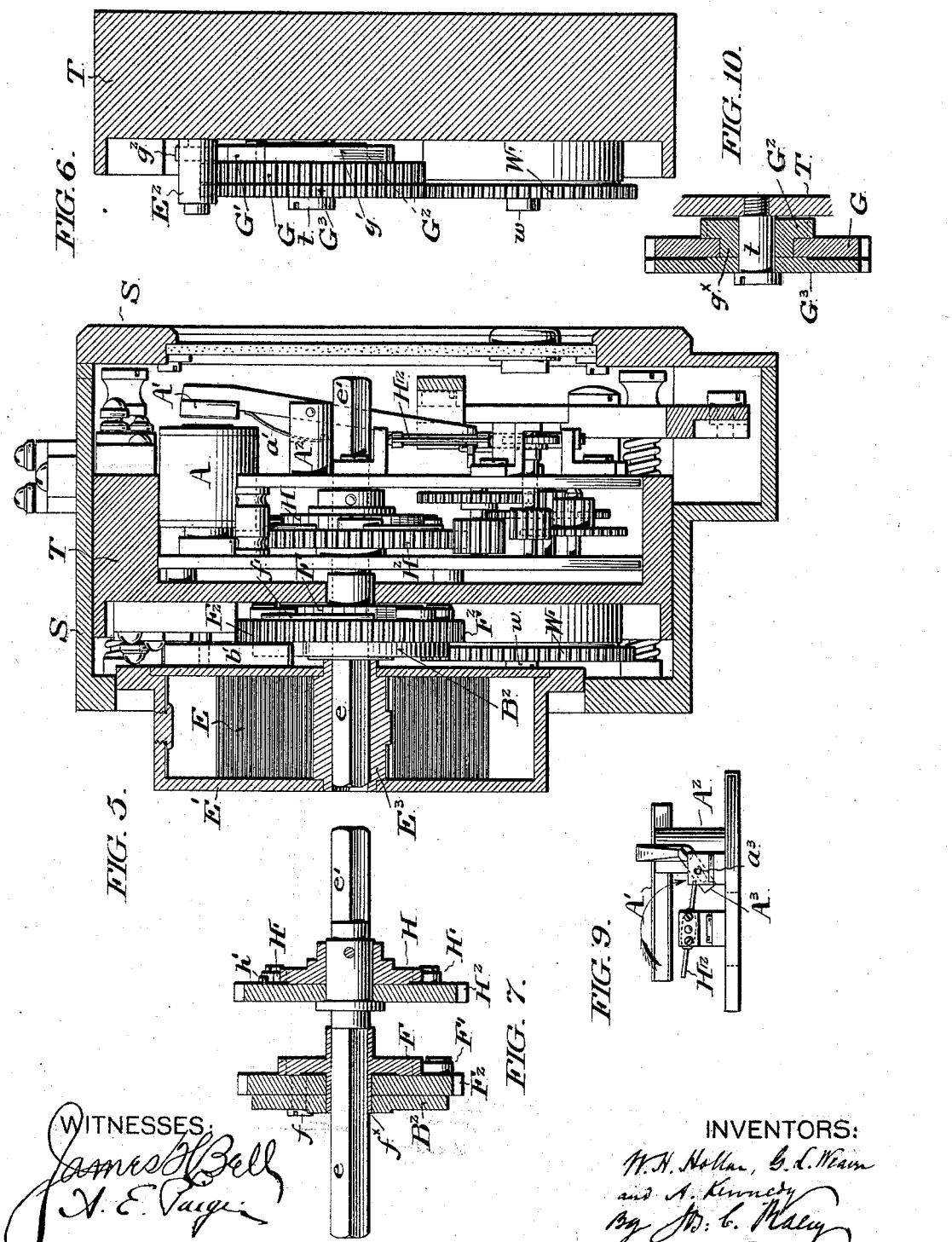

UNITED STATES PATENT OFFICE.

WILLIAM H. HOLLAR, OF PHILADELPHIA, PENNSYLVANIA, GEORGE L. WEAVER, OF BOSTON, MASSACHUSETTS, AND ANTHONY KENNEDY, OF CHARLESTOWN, WEST VIRGINIA; SAID WEAVER AND KENNEDY ASSIGNORS TO SAID HOLLAR.

ELECTRICALLY-CONTROLLED WINDING MECHANISM FOR TIME-LOCKS.

SPECIFICATION forming part of Letters Patent No. 545,020, dated August 20, 1895.

Application filed April 1, 1895. Serial No. 543,997. (No model.)

*To all whom it may concern:*

Be it known that we, WILLIAM H. HOLLAR, of the city of Philadelphia, in the State of Pennsylvania, GEORGE L. WEAVER, of the city of Boston, in the State of Massachusetts, and ANTHONY KENNEDY, of Charlestown, in the State of West Virginia, have invented a certain new and useful Electrically-Controlled Winding Mechanism for Time-Locks, whereof the following is a specification, reference being had to the accompanying drawings.

Our invention is primarily intended for use in connection with ordinary time-locks, such as are employed upon safes, vaults, &c., and its main purpose is to permit the rewinding of the clock-movement of the time-lock without opening the safe or otherwise exposing the lock mechanism. Thus, for instance, supposing that a time-lock has been set to open a vault at a given hour, and as the hour approaches a riot or conflagration be in progress in the neighborhood, it may be of the highest importance to rewind the time-lock so as to postpone the opening moment of the safe for a greater or less period, according as the emergency may demand. Obviously, the very risk which would require the rewinding of the clock mechanism would practically preclude the possibility of opening the vault for that purpose, and hence the device which we have invented and are now about to describe would be a most valuable adjunct in connection with very important time-locks.

In the accompanying drawings, Figures 1 and 2 represent diagrammatically two types of a general system of control with a view to more particularly point out the relations of the main operative parts and convenient adjuncts thereto. Hence said views only indicate conventionally certain primary elements of the mechanism. Fig. 3 is a view in elevation of the front face of a time-lock mechanism to which our improvements have been applied. Fig. 4 is a rear view of said device with the entire outer casing and the rewinding-spring removed. Fig. 5 is a vertical transverse section through the device on the line 5 5 of Fig. 4, certain parts being shown in elevation. Fig. 6 is a similar sectional view on the line 6 6, Fig. 4. Figs. 7, 8, 9, and 10 are detached views of details shown in the other figures.

In ordinary time-locks it is usual to employ a plurality of clock-movements—say four in number—which are wound together and run simultaneously, the purpose of course being to avoid the risk of breaking down of any one or more movements less than the whole number and the consequent failure of the time mechanism to release the lock after the lapse of the predetermined interval.

In order to adapt our device to ordinary time-locks, we have represented it in connection with such a lock, which would originally have comprised four clock-movements, and we have so constructed and adapted the working parts which relate to our invention as to permit of their combination with the clock-case by the withdrawal of one of the four clock-movements and the substitution of said working parts in the recess formerly occupied by said clock-movement. Furthermore, while it is desirable in ordinary running that there should be a plurality of clock-movements in simultaneous operation, we have not deemed it necessary to provide an apparatus of sufficient capacity to rewind all of these in case of emergency. This restriction is, however, not one of principle, but of detail, and tends merely toward a reduction in size of the working parts, so that they may be readily combined with time-locks of the ordinary type and require no substantial increase in bulk.

To broadly state the main features of our invention we would say that they comprise, in combination with a safe or vault and a time-lock therefor, a rewinding-motor—such as a coiled spring—normally ready to act, but restrained by a detent; mechanism operatively connecting said motor with the winding member of the time-lock clock-movement, and an electrically-controlled disengaging device operatively connected with the detent, said disengaging device being included in an electric circuit extending to a point exterior to the safe or vault and provided with a circuit-controller, whereby the circuit may be modified to actuate the disengaging device and permit the action of the rewinding-motor.

With the foregoing main elements are combined certain adjuncts—such, for instance, as devices for prolonging, reporting, or predetermining the extent to which the rewinding action has been or is to be operative.

Referring to the diagrammatic view of Fig. 1, let it be assumed that X represents the vault having a time-lock (not shown) on the interior of its door. Let it be further assumed that the dotted circle at $E^\times$ represents rewinding mechanism provided with a motor ready to act and capable when set free of rewinding one or more of the clock-movements comprised within the time-lock. Let it be also supposed that the group indicated at $A^\times$ represents an electromagnet A and movable armature A', the latter constituting a detent which normally restrains the rewinding mechanism at $E^\times$. R R represent wires in circuit with a battery R', and with the coils of said electromagnet leading to a circuit-closer $a$ exterior to the vault. If the circuit be closed and the magnet energized, the armature will be shifted so as to disengage the detent of the rewinding-motor, and the latter will commence to operate upon the clock-spring. This might, of course, cause the complete rewinding of the clock-spring in the lock movement; but to avoid the dangers attendant upon overwinding it is desirable to control the period or extent of operation of the rewinding mechanism. To this end let it be assumed that the circle at B indicates a rotating disk $B^2$, having a cam-notch in its periphery, said disk being in operative connection with the rewinding mechanism, so that it will commence and continue to rotate therewith. Let it be assumed that $b\ b'$ are two elastic terminal electrodes forming part of the circuit which controls the electromagnet and detained normally out of contact with each other, and that when the rotation of the disk $B^2$ takes place the said electrodes will be brought into contact by riding on the surface of the disk from the cam-notch to the unbroken portion of the periphery. Said electrodes would therefore be in electrical contact with one another during a period corresponding to a single rotation of the disk $B^2$, when they would again re-enter the notch and spring apart into their normal position. Obviously if such a device were combined with the simple controlling device just described the operation would be that as soon as the detent were shifted and the rewinding mechanism disengaged the disk $B^2$ would commence rotation and the circuit would be completed through the electrodes $b\ b'$ and maintained during the period of rotation of the disk. Thus, even if the operator had only momentarily established the connection at the point $a$ to energize the electromagnet, the circuit would be maintained automatically by means of the disk $B^2$ and electrodes $b\ b'$, so that the operator would not be obliged to maintain the circuit during this period; but when it had lapsed and the circuit was again broken the detent would again engage the rewinding mechanism and check the action of the latter.

Referring to the similar diagrammatic view of Fig. 2, let it be assumed that $a^\times$ represents a circuit-closing dial, rotatable in the direction of the arrows marked upon it, and that the rate of said rotation is such that the operations of starting, rewinding, and disengagement of the rewinding mechanism above described may take place in the interval between the successive contacts of the radial projections $a^2$ of the disk $a^\times$ with the opposed spring-terminals $a^3\ a^4$ of the wires R R. Let it be further assumed that the amount of rotation of the dial $a^\times$ may be predetermined, and it is obvious that the operation of rewinding may be repeated a predetermined number of times without the presence of the operator. The circuit-closing dial $a^\times$ may have any number of projections, and if these are consecutively numbered, as shown in Fig. 2, the position of the dial reports the number of times the circuit has been closed through the electromagnet A, and consequently the extent of the rewinding action.

In order that the operator may at once know that the rewinding mechanism has been set in operation, a convenient adjunct to the above-described devices is a tell-tale D, electrically operated through wires $r\ r$ by means of a contact-disk C and spring-terminals $c\ c'$, the said disk being in operative connection with the rewinding mechanism, so that it will commence and continue to rotate therewith.

As shown in Fig. 2, the tell-tale D consists of a simple electromagnet having an indicating-armature. As shown in Fig. 1, the tell-tale D is provided with a graduated dial and movable pointer which may be automatically operated by a suitable step-by-step movement of ordinary construction, causing the pointer to shift through one space under each impulse caused by the closing of the electric current through wires $r\ r$. The tell-tale of Fig. 1 would thus report not only that the rewinding mechanism was in operation, but by the relation of the pointer to its graduated dial would indicate the extent of said rewinding action.

As shown in Fig. 1, the tell-tale is provided with a separate circuit supplied with current from a separate battery, but as shown in Fig. 2, the wires $r\ r$ may be arranged in multiple arc with wires R R, and current to operate the tell-tale D be derived from the common battery R'.

A convenient embodiment of the main features of our invention is illustrated in Figs. 3 to 10 of the drawings, as applied to a time-lock comprising the clock-movements W, W, and $W^\times$, having the usual rotary front dials $W^2$, provided with tripping-pins $W^3$ adapted to engage with lugs $Y^2$ upon the link Y' of the levers Y Y. The movement of the linked levers Y Y, when engaged by the tripping-pins $W^3$, effects the release of the lock through the usual connection to said levers.

$E^x$ is a spring-motor, mounted in the recessed block T, inclosed in the ordinary time-lock casing S. Said motor has a coiled spring E, the outer end of which is secured to a spring-cylinder $E'$, supported from the rear face of the block T upon the three projecting posts $E^2$. The inner end of said spring E is attached to an arbor-sleeve $E^3$, rotatably mounted in the cylinder $E'$, and having a square opening through it fitting upon the rear end of an arbor $e$. The front end $e'$ of the arbor $e$ is squared to receive a key, by which the motor-spring E may be wound.

Upon arbor $e$ and within the front recess of block T is rigidly mounted a ratchet-wheel H. In Fig. 3, directly behind wheel H and shown in section in Fig. 7, a gear-wheel $H^2$ is loosely mounted on the arbor $e$. Said wheel $H^2$ has three pawls $H'$ pivoted upon its front face, and three springs $h'$ hold said pawls in position to engage with ratchet H when motor-spring E is rewinding clock-movement $W^x$, but permits arbor $e$ to rotate in the opposite direction to wind motor-spring E without the rotation of the gear $H^2$ and its connected train of gears. The train of gears, which begins with $H^2$ and ends with the governing-fan $H^{12}$, serves to control the speed of unwinding of the motor-spring E. Such an arrangement is desirable, that the delicate adjustment of the clock-movement may not be destroyed by too rapid rewinding. The detent which, until it is electrically withdrawn, prevents the action of the motor $E^x$, is conveniently applied to the governing-fan $H^{12}$, and consists of a lever $A^3$ loosely fulcrumed upon the fixed stud $a^3$ and normally projecting in the path of rotation of the fan $H^{12}$, as shown in Fig. 9. The movement of the detent is effected by an armature-lever $A'$, to the lower end of which the detent $A^3$ is loosely pivoted. Said armature-lever $A'$ has its fulcrum upon the fixed post $A^2$, and its upper widened end is normally a short distance away from the poles of an electromagnet A. The parts are maintained in their normal position by the flat spring $a'$, secured in the post $A^2$ and bearing against the rear side of the armature-lever $A'$, as shown in Fig. 5.

Let it be assumed that the electromagnet A is in circuit, as shown in Figs. 1 or 2, and it is obvious that when said magnet is energized the widened end of the armature-lever $A'$ will be attracted thereby. The detent $A^3$ will be withdrawn clear of the fan $H^{12}$, and the latter, with its connected train, including gear $H^2$, ratchet H, arbor $e$, and spring E will be free to rotate until the breaking of the circuit through the electromagnet A permits the spring $a'$ to return the armature-lever $A'$ and detent $A^3$ to their normal position.

In the time-lock which we have shown as provided with three clock-movements W, W, and $W^x$, any one of the three movements when in proper order is capable of performing the function of the time-lock—i. e., releasing the lock after a predetermined interval. For simplicity of illustration we have shown our invention as adapted to rewind but one of the clock-movements, that marked $W^x$. With this organization it is necessary to stop the other two movements W W to prevent the premature release of the lock by either of them. A convenient stop mechanism is shown in Figs. 4 and 8. The dotted circles $w'$ $w'$ indicate gears in the respective clock-movements W W. The spring stop-pins $w^2$ $w^2$, suitably mounted on the slide V, project through openings $t^2$ in the rear face of the block T, and are, in the normal position of said slide, held clear of the teeth upon the gears $w'$ $w'$; but movement of the slide V in the direction of the arrows will press the stop-pins $w^2$ $w^2$ into lateral engagement with the teeth of the gears $w'$ $w'$ and prevent their further rotation. A keeper-spring $v^2$ upon the slide V, by the engagement of its pointed end in either of the notches $V^3$ $V^3$, prevents the accidental displacement of the slide; but when the arbor $e$ first rotates in the direction indicated by the arrow on Fig. 4 to rewind the movement $W^x$, the cam projection $v$ encounters the inclined end $V'$ of the slide V and shifts the slide V and stop-pins $w^2$ $w^2$ into lateral engagement with the gears $w'$ $w'$. The keeper-spring $V^2$ engages with the corresponding notch $V^3$, and the arrested movements W W so remain until manually released by retraction of the slide V.

As shown in Figs. 4, 5, and 7, the arbor $e$ is provided with a second ratchet-wheel F, placed in the rear of the ratchet-wheel H, and, like it, secured upon the arbor $e$, so as to rotate therewith. In the rear of the ratchet-wheel F and loosely mounted upon its hub $f^x$ is a gear-wheel $F^2$, provided with three pawls $F'$ and three pawl-springs $f'$, similar to the pawls and the springs of the gear $H^2$ and for a like purpose, i. e., to engage with ratchet-wheel F when the motor-spring E is rewinding the clock movement $W^x$, but permitting the arbor $e$ and ratchet-wheel F to rotate in the opposite direction when the motor-spring E is wound without the rotation of the gear $F^2$ and its connected parts. The gear $F^2$ serves both as a convenient support for the cam projection $v$, by which the stop mechanism is operated, as above described, and also as a support for the secondary circuit-closer disk $B^2$, which is adjustably secured to the gear $F^2$ by screws $ff$ through slots $b^3$ $b^3$ in said disk $B^2$. From the gear $F^2$ connection is made to effect the rewinding of the clock-movement $W^x$.

The precise construction of the connecting medium between the rewinding-motor and the winding member of the clock-movement $W^x$ is not of the essence of our invention; but said medium may consist of any clutch mechanism which is capable of automatical engagement to rewind said clock-movement and of subsequent disengagement to permit the free operation of said clock-movement. The winding members of each of the clock-movements are their respective mainspring-arbors, which are squared upon their front ends to receive the ordinary key, and extend through the rear of their mainspring-cylinders, as shown at $w\ w$ in Fig. 4. The movement $W^\times$ is adapted to be rewound by being provided with a gear $W'$, mounted upon the rear end of its winding member $w^\times$. A stud $t$, projecting from the block T, serves to support a convenient form of clutch of the type above referred to, consisting, in this instance, of a gear $G^3$, meshing with a gear $W'$ of the clock-movement. The gear $G^3$, being in a plane rearward of the gear $F^2$, does not mesh with the latter, the apparent meshing of the two, which might seem to be indicated by Fig. 4, being due to the fact that the gear $F^2$ is in mesh with a gear G, similar to the gear $G^3$ and directly behind the same, but loosely mounted upon the hub $g^\times$ of the clutch-ratchet $G^2$, which is integral with the gear $G^3$. The gear G is provided with a single pawl $G'$ and a pawl-spring $g'$, constantly tending to throw the pawl $G'$ into engagement with the ratchet-wheel $G^2$.

As shown in Figs. 4 and 6, a roller $g^2$ is mounted upon the rear face of the block T in such a position as to lift the pawl $G'$ of the wheel G out of engagement with the ratchet $G^2$ of the wheel $G^3$ when the pawl $G'$ passes under said roller $g^2$.

The parts just described are so related that when the rewinding-motor $E^\times$ ceases to rotate by reason of the breaking of the electric circuit through the electromagnet A, due to the separation of the elastic terminal electrodes $b\ b'$, the pawl $G'$ shall be beneath and disengaged by the roller $g^2$. Hence, in either the normal operating condition of the time-lock, as shown in Fig. 4, or after the clock-movement $W^\times$ has been rewound and the movements W W stopped, the winding member $w^\times$ of the movement $W^\times$ is free to rotate, together with its gear-wheel $W'$, the gear $G^3$ and ratchet-wheel $G^2$ being idly rotated upon the stud $t$. The rotation of the gear G and its attached pawl $G'$ is prevented under normal conditions by reason of the intermeshing of the gear G with the normally-stationary gear $F^2$ upon the rewinding-arbor $e$.

The operation of the device is as follows: Let it be assumed that the three clock-movements W W $W^\times$ have been simultaneously wound by hand and set to release the lock after a certain interval. The rewinding-motor being in its normal condition, the spring E is fully wound, but held stationary by the detent $A^3$. The three clock-movements progress simultaneously until the operator completes the electric circuit through the electromagnet A at one of the primary circuit-closers $a$ of Fig. 1 or $a^\times$ of Fig. 2. The armature-lever $A'$ is attracted by the magnet A, its spring $a'$ compressed, and the detent $A^3$ withdrawn from engagement with the fan $H^{12}$, permitting the rotation of the arbor $e$ and spring E. The rotation of the arbor $e$ brings the cam projection $v$ against the inclined end $V'$ of the stop mechanism, and the clock-movements W W are arrested. The simultaneous rotation of the secondary circuit-closing disk $B^2$ shifts the elastic terminal electrodes $b\ b'$ from the recess $b^2$, and the circuit through the magnet A is closed by their contact before the circuit is broken by the primary circuit-closer $a$ or $a^\times$, and so remains during a revolution of the arbor $e$. The rotation of the arbor $e$, gear $F^2$, and the intermeshed gear G shifts the pawl $G'$ from under the roller $g^2$ and allows the pawl $G'$ to clutch the ratchet $G^2$ and rewind the clock-movement $W^\times$ through gears $G^3$ and $W'$. The arbor $e$, disk $B^2$, and the ratchet-clutch $G'\ G^2$, having made a complete revolution, the elastic terminal electrodes $b\ b'$ are again separated in the recess $b^2$ of the disk $B^2$. The consequent return of the detent $A^3$ to engagement with the fan $H^{12}$ stops the ratchet-clutch $G'\ G^2$ in its normal disengaged position, and the clock-movement $W^\times$ is again free to rotate to effect the release of the lock at the moment to which said release has been postponed by the rewinding of the clock-movement $W^\times$.

It is obvious that the construction of the rewinding-motor, its speed and capacity of rotation may be greatly varied to suit the circumstances of its application without departing from the spirit of our invention.

We claim—

1. The combination with a time lock for a vault or safe, of a rewinding motor operatively related to the clock spring of the time lock movement; a detent normally restraining the action of the said rewinding motor; an electrically actuated disengaging device for said detent; an electric circuit controlling said disengaging device independently of the clock mechanism; and means situated exterior to the vault whereby said circuit may be controlled, substantially as set forth.

2. In a time lock, the combination, with a clock movement, of a re-winding motor operatively related to the clock spring; a detent normally restraining the action of said rewinding motor; an electro-magnet operatively related to said detent; an electric circuit including said electro-magnet and provided with a primary circuit-closer; a secondary circuit-closer adapted to close said circuit independently of the primary circuit-closer, and controlling mechanism, substantially as set forth, operatively connecting the winding motor with the secondary circuit-closer, whereby, upon the disengagement of the detent from the re-winding motor, said detent may be automatically restrained from re-engagement during a predetermined period of the re-winding action, substantially as set forth.

3. In a time lock, the combination, with a clock movement, of a re-winding motor operatively related to the clock spring; a detent normally restraining the action of said rewinding motor; an electro-magnet operatively related to said detent; an electric circuit including said electro-magnet and provided with a primary circuit-closer; a secondary circuit-closer, adapted to close said circuit independently of the primary circuit-closer; controlling mechanism, substantially as set forth, operatively connecting the re-winding motor with the secondary circuit-closer, whereby, upon the disengagement of the detent from the re-winding motor, said detent may be automatically restrained from re-engagement during a predetermined period of the re-winding action; and automatic circuit-closing mechanism, whereby the primary circuit-closer may be actuated to a predetermined extent, substantially as set forth.

4. In a time lock, the combination, with a clock movement, of a re-winding motor operatively related to the clock spring; a detent normally restraining the action of said re-winding motor; an electro-magnet operatively related to said detent; an electric circuit including said electro-magnet and provided with a primary circuit-closer; a secondary circuit-closer; controlling mechanism, substantially as set forth, operatively connecting the re-winding motor with the secondary circuit-closer, whereby, upon the disengagement of the detent from the re-winding motor, said detent may be automatically restrained from re-engagement during a predetermined period of the re-winding action; a tell-tale; a circuit operatively related to said tell-tale; and an automatic circuit-closer for said tell-tale circuit, operatively connected with the re-winding motor, whereby the extent of operation of the re-winding motor may be reported, substantially as described.

5. In a time lock, the combination, with a clock movement, of a mechanically actuated, re-winding motor normally ready to act; a detent normally restraining the action of said re-winding motor; clutch mechanism, substantially as set forth, intermediate between said re-winding motor and the winding member of the clock spring; automatic controlling mechanism, substantially as set forth, whereby said clutch is shifted into and out of operation at the commencement and cessation respectively of the re-winding movement; and an electrically controlled disengaging device for said detent, substantially as set forth.

6. In a time lock comprising a plurality of clock movements, the combination with one or more clock movements less than the whole number, of a re-winding motor operatively related to the spring or springs of said clock or clocks; a detent normally restraining the action of said re-winding motor; an electrically controlled disengaging device for said detent; and stop mechanism operated by said re-winding motor and operatively related to the clock movement or movements not connected with the re-winding motor, whereby, upon the re-winding of the clock movement or movements selected for that purpose, the remaining clock movement or movements may be automatically stopped, substantially as and for the purposes set forth.

7. In a time lock, the combination, with a clock movement, of a re-winding motor; a detent normally restraining the action thereof; an electro-magnet operatively related to said detent; an electric circuit including said electro-magnet and provided with a primary circuit-closer; mechanism substantially as set forth operatively connecting the re-winding motor with the winding member of the clock movement; a secondary circuit-closer adapted to close the said circuit independently of said primary circuit-closer, said secondary circuit-closer comprising an elastic terminal normally out of contact with the other terminal; and a cam disk operated by the re-winding mechanism and engaging said elastic terminal, said cam disk having a portion of its periphery recessed, whereby when said terminal is in engagement with the recessed portion of the disk, the circuit will be open, and when said terminal is in engagement with the non-recessed portion of the disk, the circuit will be closed, substantially as set forth.

8. In a time lock, the combination, with a clock movement, of a re-winding motor; a detent normally restraining the action thereof; an electrically controlled disengaging device for said detent; a train of gearing intermediate between said re-winding motor and the winding member of the clock movement, said train including clutch mechanism; a disengaging device for said clutch mechanism arranged at a given point in the path of travel of the clutch; an automatic circuit-controller connected with said train and adapted to maintain a closed circuit during a predetermined period of operation of the train and to open the circuit at the conclusion of such period, the opening position of said circuit-controller corresponding with the position of the clutch mechanism at its disengaging moment, substantially as set forth.

WM. H. HOLLAR.
GEORGE L. WEAVER.
ANTHONY KENNEDY.

Witnesses:
JAMES H. BELL,
G. HERBERT JENKINS.